Figure 1:
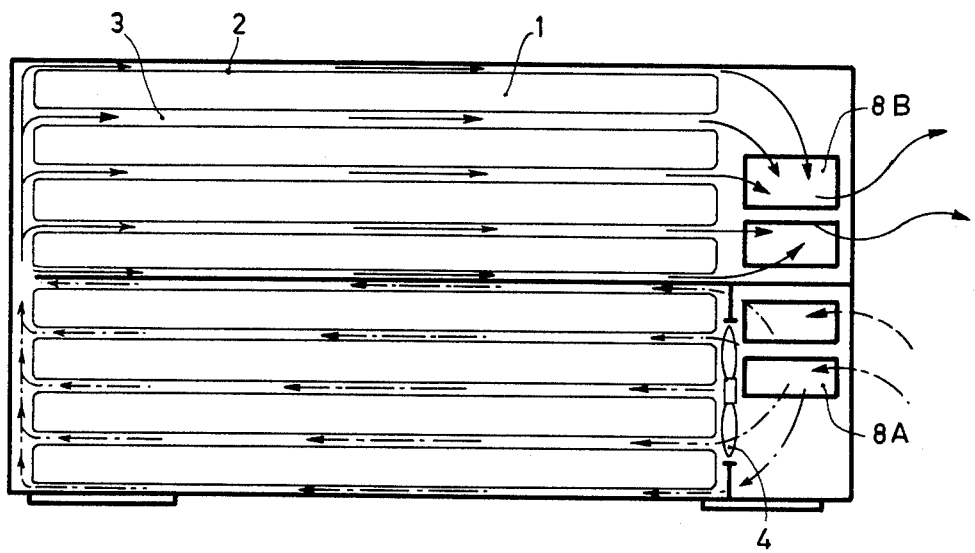

United States Patent [19]

Schroder

[11] 4,104,185

[45] Aug. 1, 1978

[54] LATENT HEAT ACCUMULATOR

[75] Inventor: Johann Schröder, Aachen, Fed. Rep. of Germany

[73] Assignee: U.S. Philips Corporation, New York, N.Y.

[21] Appl. No.: 676,649

[22] Filed: Apr. 14, 1976

[30] Foreign Application Priority Data

Apr. 23, 1975 [DE] Fed. Rep. of Germany ....... 2517920

[51] Int. Cl.² .............................................. C09K 5/06
[52] U.S. Cl. ..................... 252/70; 126/400; 165/104 S; 165/DIG. 4
[58] Field of Search ................... 252/70, 71; 126/400; 165/104 S, DIG. 4; 423/490

[56] References Cited

U.S. PATENT DOCUMENTS

| | | | |
|---|---|---|---|
| 2,677,243 | 5/1954 | Telkes | 62/4 |
| 2,677,664 | 5/1954 | Telkes | 252/70 |
| 3,532,856 | 10/1970 | Collins | 165/104 S X |
| 3,709,209 | 1/1973 | Schroder | 126/400 |
| 3,960,207 | 6/1976 | Boer | 126/400 X |

Primary Examiner—Harris A. Pitlick
Attorney, Agent, or Firm—Frank R. Trifari; Rolf E. Schneider

[57] ABSTRACT

A heat accumulator in which the heat-energy storage medium consists essentially of a potassium fluoride-water system having a potassium fluoride content between 44 and 48% by weight.

4 Claims, 4 Drawing Figures

LATENT HEAT ACCUMULATOR

This invention relates to a latent heat accumulator having a salt hydrate as the energy storage medium.

Latent heat accumulators can accumulate energy in the form of stored latent heat in a fused medium and reversibly release heat on crystallization of the storage medium. The energy stored in this way can be used for either cooling or heating purposes.

An advantage of latent heat accumulators compared with respect to accumulators which accumulate sensible heat by means of an increasing temperature (such as, for example, accumulators having water, stone or earth as the storage medium) is the heat stored or given off respectively is at a constant temperature which is optimally adapted to the relevant application. Furthermore, latent heat accumulators generally have a higher energy storage capacity per volume and weight unit, which especially applies to water/ice systems and some salt hydrates (M. Telkes, ASHRAE, Journal 16, September 1974, pages 38–44).

A disadvantage of known salt hydrate heat accumulators is that the hydrates have a poor tendency to nucleation and a low crystallization rate so that supercooling occurs, i.e. on cooling to below the melting point no crystallization of the storage medium takes place and consequently also no emission of the heat of fusion takes place. The result is that such a latent heat storage medium, even at a much lower temperature than the melting point, does not crystallize or crystallizes so slowly that the heat released on crystallization cannot be utilized.

It is, furthermore, known that to solve this problem additions of nucleating substances (seed crystals) can be used which do not dissolve in the storage medium but which considerably increase the number of nuclei formed owing to the structure and surface condition. Owing to the low rate of crystallization these seeds must, however, be finely dispersed in the storage medium. This can be attained by congealing the mass which contains the seeds by adding an organic or an inorganic colloidally dispersed carrier material such as gelatine and waterglass (German Pat. No. 1,928,694) or by having the aforesaid mass absorbed by a porous carrier material (German Pat. No. 1,937,804).

A great disadvantage is that the melting of ice and also of most hydrates is a process which is accompanied by a change in volume. However, in contradistinction to most substances the volume increases at a decreasing temperature and also on solidifying. The result is that when the former substances are used, pressure is exerted on the storage tanks which may consequently burst so that proper wall materials and flexible constructions must be used. This can be both elaborate and expensive.

The storage temperatures of most of the latent heat accumulators which have been proposed prior to the present invention for heating purposes are above 30° (Telkes l.c.; German Pat. No. 1,928,694). For cooling purposes a mixture of sodium sulphate, common salt, borax and water has also been described which must solidify between 10° and 20° C (German Pat. No. 1,966,720). This mixture has the disadvantage that separation of the substances may occur. Therefore the reversible operation requires, in any case, an extra carrier material. Furthermore, borax is comparatively expensive. Both cases also require insulation which is in accordance with the temperature level and the required storage time. This, of course, also applies to known accumulators utilizing water, stone or earth as the storage medium.

It is an object of the invention to store energy for heating and cooling purposes for a longer period, for example from summer to winter, at, or as near as possible to, the ambient temperature.

According to the present invention there is provided a latent heat accumulator having a salt hydrate as the energy storage medium, which is characterized in that the storage medium consists of a potassium-fluoride-water system, having a potassium fluoride content of between 44 and 48 weight %, the rest being water. Preferably the storage medium consists of $KF.4H_2O$, which melts at 18.5° C.

$KF.4H_2O$ which contains 44.7 weight % of KF has a congruent melting point of 18.5° C. With a mixture of 47.7 weight % of KF, and the remainder water a eutectic is formed which has a melting point of 17.7° C. In the range of between 44.7 and 47.7 weight % of KF the heat of fusion is about 53 k.cal/kg and 79 k.cal/l. The density at 20° C is 1.49 g/cm$^3$.

The said medium is an excellent storage medium because of its very large heat of fusion and its favourable melting temperatures (for example, at cellar or floor temperature) as compared to all other storage media, and therefore costly insulation is superfluous and any possible heat losses also during storage for the whole year are very low.

The storage medium according to the invention is a waste product of the phosphate industry; it is cheap and available in large quantities. It is non-corrosive with respect to synthetic materials and aluminium and copper. No supercooling occurs when crystallization nuclei are added. In the solid state no phase transformation takes place which might cause the accumulator tanks to burst. When used for cooling purposes the accumulator according to the invention may be charged from cold night air, in which case only a fan is needed. For cooling, heating and for a hot water supply it may be useful to operate the accumulator according to the invention in association with a heat pump.

The latent heat accumulator according to the invention may be provided with seed crystals, to facilitate crystallization of the $KF.4H_2O$. Suitable seed-crystal materials are, for example, the same or chemically related compounds which are isomorphous or are as isomorphous as possible with the compound in question or surface active materials which, in any given circumstances, do not dissolve or only partly dissolve in the storage medium. It may further be advantageous to add one or more carrier materials to the $KF.4H_2O$. Suitable carrier materials are, for example, gelatine, silicic acid, montmorillonite, polysaccharides, pectins and many other polymers. A further embodiment of the accumulator according to the invention consists in that the storage medium is stored in plastic tanks which are subdivided into various small reservoirs with interspaces for heat exchange.

The advantages of the storage medium $KF/H_2O$ in accordance with the invention can be summarized as follows:

1. An extremely high latent heat storage capacity per volume unit, which approximately corresponds with double the capacity of a warm water accumulator (T90 → 45° C), in which the volume and the extra costs for insulation for compensating for the higher heat losses of the heat acumulator have not been taken into account;

2. A melting temperature equal to or only slightly different from the ambient temperature (for example of a basement, a cellar or a floor); consequently small heat losses and little cost for insulation; a rational storage from summer to winter is possible with for example an insulation of from 2 to 6 cm thick plastic foam;

3. In contrast with other known salt hydrates and ice no noticeable change in volume occurs at solidifying; furthermore, no phase transformation in the solid state, accompanied by a change in volume, occurs; this is particularly important because it avoids the problems of thermal-mechanical load on tanks and pipes and enables simple storage;

4. The material is chemically stable, non-combustible and does not corrode the synthetic materials which are usually used for the tanks, and aluminium and copper in the storage conditions.

5. A high efficiency when heat pumps are used, because the temperature difference at an average storage temperature, for cooling as well as for heating, is comparatively small.

6. The efficiency, when solar collectors are used, is very high as the storage temperature and the temperatures at which heat is emitted are constant and comparatively low; simple collectors having a black absorption area are sufficient.

7. Pumping the salt melt for heat transport over comparatively large differences in height (for example, a roof collector-cellar accumulator) requires little energy as owing to the comparatively low temperature as well as to the reduction in the vapour pressure by the hydrate (the water vapour pressure at 100° C amounts to only 125 Torr, water 760 Torr) a communicating risedrop pipe over a height of 8 m is possible even at 100° C. Furthermore, the potassium fluoride hydrate has a relatively low viscosity (only slightly higher than that of water).

Figure 2:
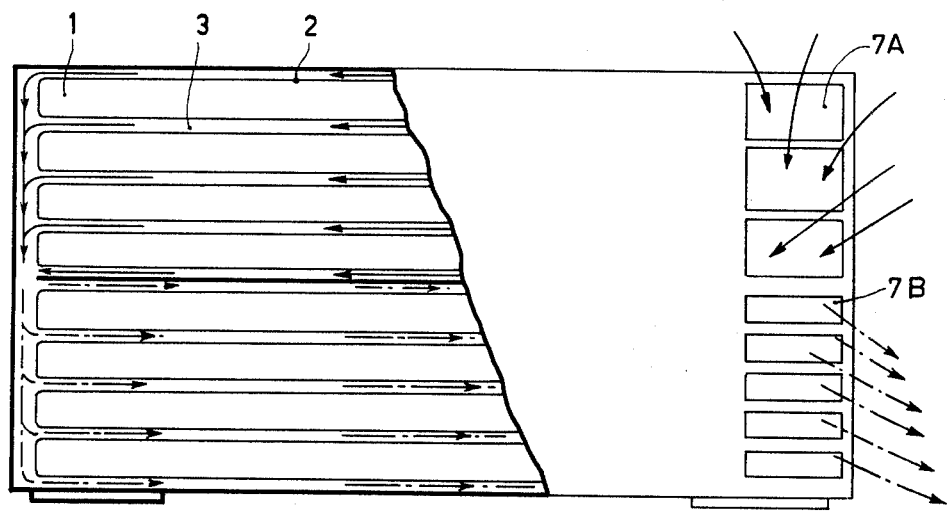
Figure 3:
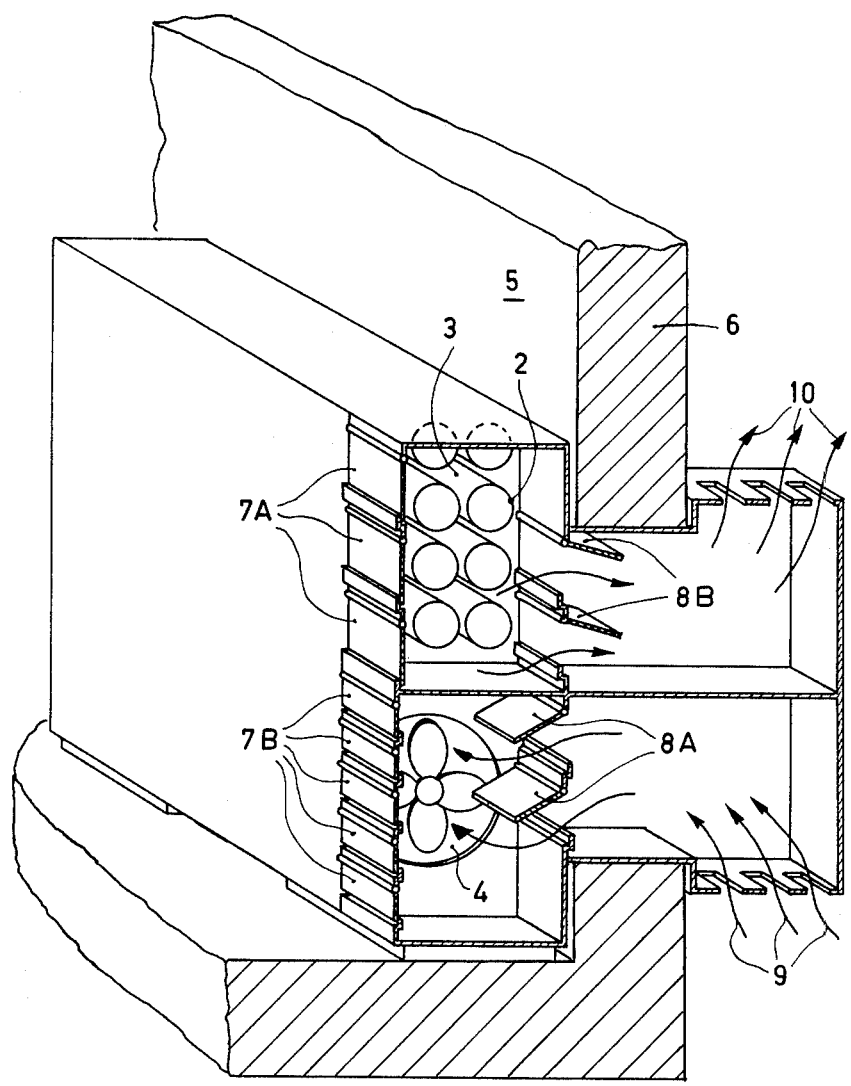
Figure 4:
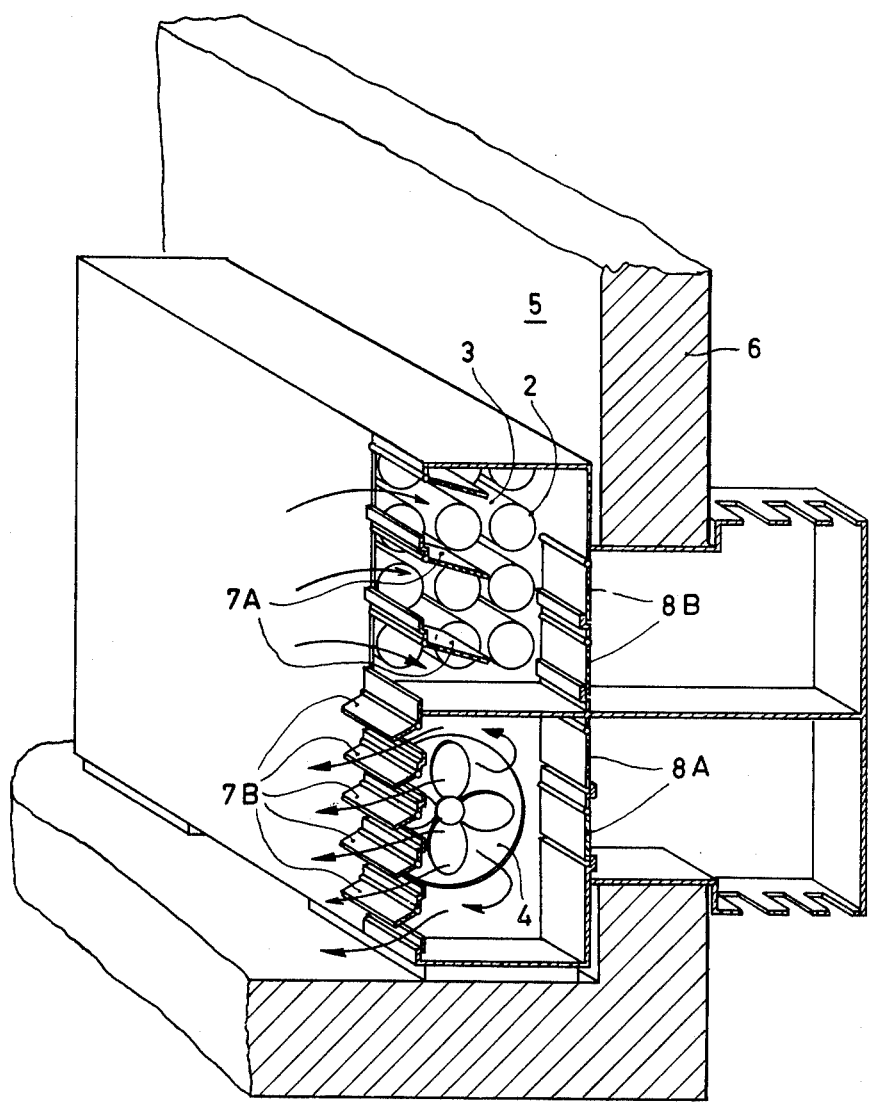

An embodiment according to the invention, more specifically a cold accumulator, which can be used for cooling houses in dry, hot regions, is schematically shown in the accompanying drawings, in which:

FIG. 1 shows a front view of a heat accumulator with its front wall removed in operation, for example at night, FIG. 2 shows a front view of the heat accumulator according to FIG. 1 with its front wall shown in part in operation for example during the day, FIG. 3 shows a perspective side view of the heat accumulator according to FIG. 1 with removed side walls, connected to an outer wall of a house in operation for example during the night, and FIG. 4 shows a perspective side view of the heat accumulator according to FIG. 2 connected to an outer wall of a house, in operation for example during the day.

In FIGS. 1 and 2 a storage medium 1 consisting of 44.7 weight % KF and 55.3 weight % $H_2O$ is enclosed in a plurality of closed plastic tanks 2 (the manner of fixing is not shown). Each plastic tank includes some particles of pure ice as a crystal seed material. In the interspaces 3 between the tanks 2 cool or hot air respectively is moved by means of the fan 4 in the direction indicated by the arrows; solid arrows indicate hot air and dotted arrows indicate cold air. The storage medium in question may store as latent heat of fusion 53.2 kCal/kg or 79.3 kCal/l.

In FIGS. 3 and 4 the arrows have the same meaning as above. Reference 5 indicates an inner room of the house and reference 6 the wall of the house. References 7A/B and 8A/B indicate ventilation valves.

During night operation (FIGS. 1 and 3) the cooling device according to the invention operates as follows: outer air sucked in at 9 by fan 4 through the ventilation valve 8A passes into the interspaces 3 of the accumulator where this air absorbs heat. At 10 the heated air is returned to the environment through the ventilation valve 8B. The ventilation valves 7A/B, which give access to the room to be cooled during the day, are closed.

During day operation (FIGS. 2 and 4) the ventilation valves 8A/B, which lead to the environment, are closed and the ventilation valves 7A/B, leading to the room in the house, are opened. Hot air from inside the house is passed by the fan 4 through valve 7A and through the interspaces 3 where it is cooled, whereafter it flows through the valve 7B, into room 5 to be cooled. As an alternative 96% by volume of a storage medium comprising 44.7 weight % HF and 55.3 weight % $H_2O$ together with 4% by volume of gelatine may be used.

What is claimed is:

1. A method of operating a latent heat accumulator including a heat-energy storage medium, which comprises utilizing a heat-energy storage medium consisting essentially of a potassium fluoride-water system having a potassium fluoride content between 44 and 48% by weight.

2. A method according to claim 1, in which the potassium fluoride-water system consists of $KF \cdot 4H_2O$ congruently melting at 18.5° C.

3. A method according to claim 2, in which the potassium fluoride-water system includes seed crystals of ice.

4. A method according to claim 1, in which the potassium fluoride-water system consists of a eutectic mixture of 47.7% of KF and 52.3% of water by weight, said eutectic mixture having a melting point of 17.7° C.

* * * * *